United States Patent
Apte et al.

(10) Patent No.: US 6,289,395 B1
(45) Date of Patent: Sep. 11, 2001

(54) GENERIC JAVA-BASED EVENT PROCESSOR FOR SCRIPTING JAVA BEANS

(75) Inventors: Ajay Arvind Apte; Ping Chen, both of Austin; John Conrad Sanchez, Pflugerville, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/976,881

(22) Filed: Nov. 24, 1997

(51) Int. Cl.$^7$ .................................................. G06F 9/00
(52) U.S. Cl. ................................................ 709/318
(58) Field of Search ................... 709/300–305, 709/318, 310–330; 717/1

(56) References Cited

U.S. PATENT DOCUMENTS

| | | | |
|---|---|---|---|
| 5,583,993 | * 12/1996 | Foster et al. | 709/210 |
| 5,768,510 | * 6/1998 | Gish | 709/203 |
| 5,905,890 | * 5/1999 | Seaman et al. | 395/704 |
| 5,933,144 | * 8/1999 | Alcorn | 345/347 |
| 5,987,245 | * 11/1999 | Gish | 709/300 |

* cited by examiner

*Primary Examiner*—Alvin E. Oberley
*Assistant Examiner*—St. John Courtenay, III
(74) *Attorney, Agent, or Firm*—David A. Mims, Jr.; Bracewell & Patterson, L.L.P.

(57) ABSTRACT

In scripting connections between objects within a component software architecture, a generic event processing module is provided to listen to all possible events. Objects registered for scripting are introspected to determine all events which may be fired by the object. In the case of the Java beans specification, this includes both Java-defined and user-defined events. One or more event listener classes for user-defined events may then be created, instantiated and added to the registered objects at runtime. When an event is fired and detected by a system listener, the appropriate event listener notifies the client, which may be a scripting component. The client may then take appropriate action. With an event processing module as described, event sinks need not be wrapped to become event listeners and event sources need not be wrapped to generate events in a specific manner. Events may be passed between sources and sinks without either knowing of the existence of the other.

20 Claims, 13 Drawing Sheets

GENERIC JAVA-BASED EVENT PROCESSOR FOR SCRIPTING JAVA BEANS

RELATED APPLICATIONS

The present invention is related to the subject matter of the following commonly assigned, copending U.S. patent application Ser. No. 08/976,779 entitled "A Multilingual Hierarchical Scripting Environment" and filed Nov. 24, 1997; and U.S. Pat. No. 6,078,743 entitled "Generic IDE Interface Support for Scripting" and filed Nov. 24, 1997. The content of the above-referenced applications is incorporated herein by reference.

BACKGROUND OF THE INVENTION

1. Technical Field

The present invention relates in general to scripting in component software architectures and in particular to supporting event connections in scripting objects within a component software architecture such as Java. Still more particularly, the present invention relates to providing a generic event listener for arbitrary events generated in an arbitrary manner by scriptable objects within a component software architecture.

2. Description of the Related Art

Component software architectures and rapid application development (RAD) tools are increasingly proliferating. Component software architectures employ discrete software components to quickly prototype and flesh out interactive applications. Applications are built by combining a set of independent components with developer-written code which acts as a "glue" between components, usually responding directly to component events by setting component properties or invoking component methods. One currently popular component software architecture is the Java Bean specification of the Java programming language.

Developed by Sun Microsystems, the portability, security, and intrinsic distributed programming support features of the Java programming language make this language useful for Internet programming. Java is a totally object-oriented, platform independent programming language, which achieves architectural independence by compiling source code into its own intermediate representation. Java source code is not compiled into normal machine code, but is translated into code for a virtual machine specifically designed to support Java's features. A Java interpreter or a Java-enabled browser then executes the translated code. While Java source code must be compiled, no link step is required since the Java interpreter dynamically links the translated code at run time.

Java Beans is a component model for building and using Java-based software components. A "bean" is simply a Java class with extra descriptive information, similar to the concept of an OLE-type library. Unlike an OLE library, however, a bean is usually self-describing, including a file which contains the class's symbol information and method signatures and which may be scanned by a development tool to gather information about the bean, a process referred to as introspection. Any Java class with public methods may be considered a bean, but a bean typically has properties and events as well as methods.

In scripting components—writing executable scripts connecting various components—within a component software architecture such as Java beans, events fired by scriptable objects must be connected to the appropriate executable script code. However, different scriptable objects fire different events, and each event may have an arbitrary number and type of parameters which may or may not be defined in the software component architecture. For example, in the Java event model (which is a callback model in which components register for notification with the object expected to fire the event) there is no generic event listener which would act as a sink to any arbitrary event that a bean may fire. Most applications using the Java event model implement a set of custom listeners to listen for events which a bean may fire.

It would be desirable, therefore, to have a generic event listener connected to scriptable objects which listens for arbitrary events. It would further be advantageous for the event listener to allow events to be generated in an arbitrary manner, rather than in a specific format, and to pass events between a source and sink without them knowing about each other.

SUMMARY OF THE INVENTION

It is therefore one object of the present invention to provide an improved method and apparatus for scripting in component software architectures.

It is another object of the present invention to provide support for event connections in scripting objects within a component software architecture.

It is yet another object of the present invention to provide a generic event listener for arbitrary events generated in an arbitrary manner by scriptable objects within a component software architecture.

The foregoing objects are achieved as is now described. In scripting connections between objects within a component software architecture, a generic event processing module is provided to listen to all possible events. Objects registered for scripting are introspected to determine all events which may be fired by the object. In the case of the Java beans specification, this includes both Java-defined and user-defined events. One or more event listener classes for user-defined events may then be created, instantiated and added to the registered objects at runtime. When an event is fired and detected by a system listener, the appropriate event listener notifies the client, which may be a scripting component. The client may then take appropriate action. With an event processing module as described, event sinks need not be wrapped to become event listeners and event sources need not be wrapped to generate events in a specific manner. Events may be passed between sources and sinks without either knowing of the existence of the other.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
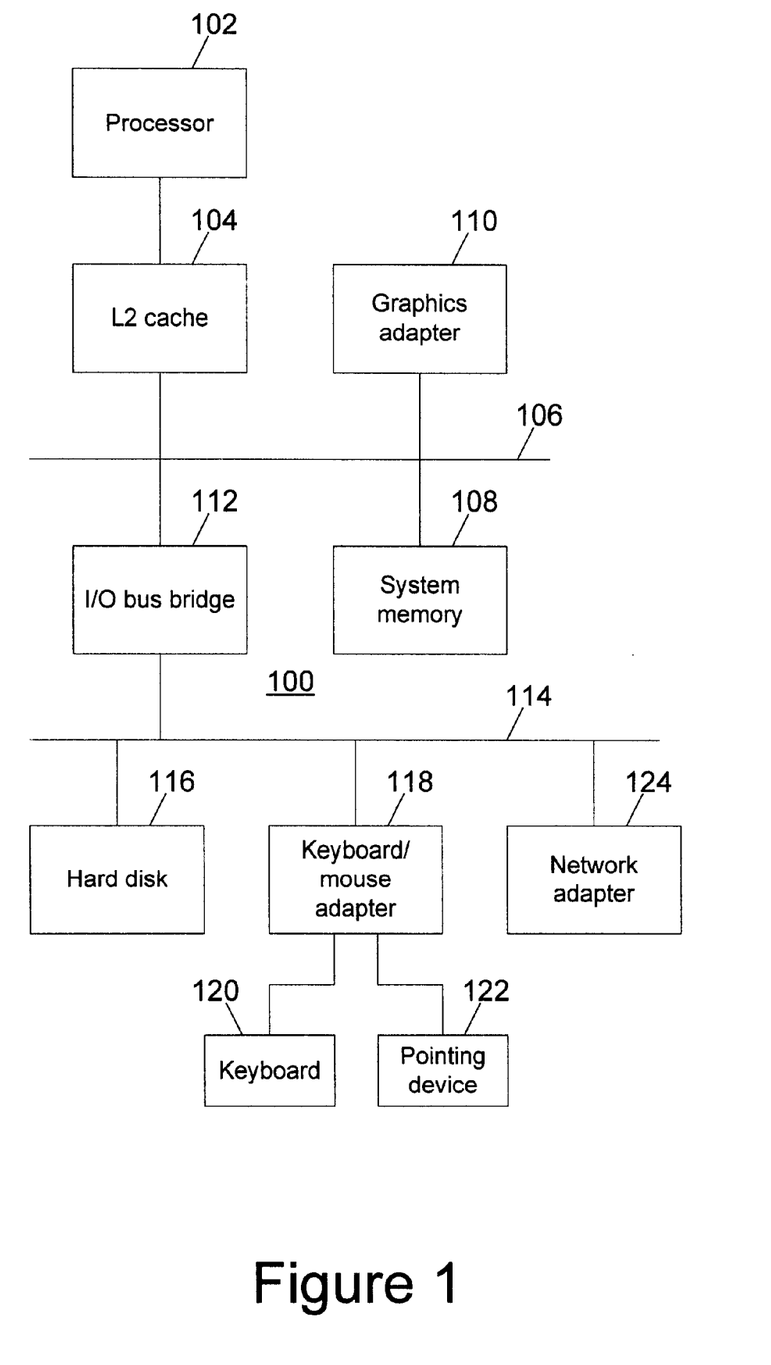
FIG. 1 depicts a block diagram of a data processing system in which a preferred embodiment of the present invention may be implemented.

With reference now to the figures, and in particular with reference to FIG. 1, a block diagram of a data processing system in which a preferred embodiment of the present invention may be implemented is depicted. Data processing system 100 in the exemplary embodiment includes a processor 102, which may be a PowerPC™ processor available for International Business Machines Corporation of Armonk, N.Y. Processor 102 is connected to a level two (L2) cache 104, which is utilized to stage data to and from processor 102 at reduced access latency. L2 cache 104 is connected in turn to an interconnect or system bus 106, which is also connected, in the embodiment depicted, to system memory 108 and memory-mapped graphics adapter 110, which provides a connection for a display device (not shown).

Also connected to system bus 106 in the exemplary embodiment is input/output (I/O) bus bridge 112, which provides an interface between system bus 106 and I/O bus 114. A nonvolatile memory such as hard disk drive 116 may be connected to I/O bus 114, as may keyboard/mouse adapter 118, which provides connection to I/O bus 114 for keyboard 120 and pointing device 122. Pointing device 122 may be a mouse, trackball, or the like. Also connected to I/O bus 114 may be network adapter 124 for connecting data processing system 100 to a local area network (LAN), the Internet, or both. Those skilled in the art will appreciate that other devices may be incorporated into data processing system 100, such as an optical disk drive or a modem.

The operation of data processing systems of the type depicted in FIG. 1 is well known in the art. Program information comprising instructions and/or data is stored on nonvolatile memory 116 and may be selectively copied into system memory 108 once data processing system 100 is powered on. Processor 102 executes the instructions within such program information and generates text or graphical information for presentation on display device connected via graphics adapter 110, where the information may be viewed by a user. The user may selectively control operation of data processing system 100 through input entered on keyboard 120 or through pointing device 122.

Figure 2:
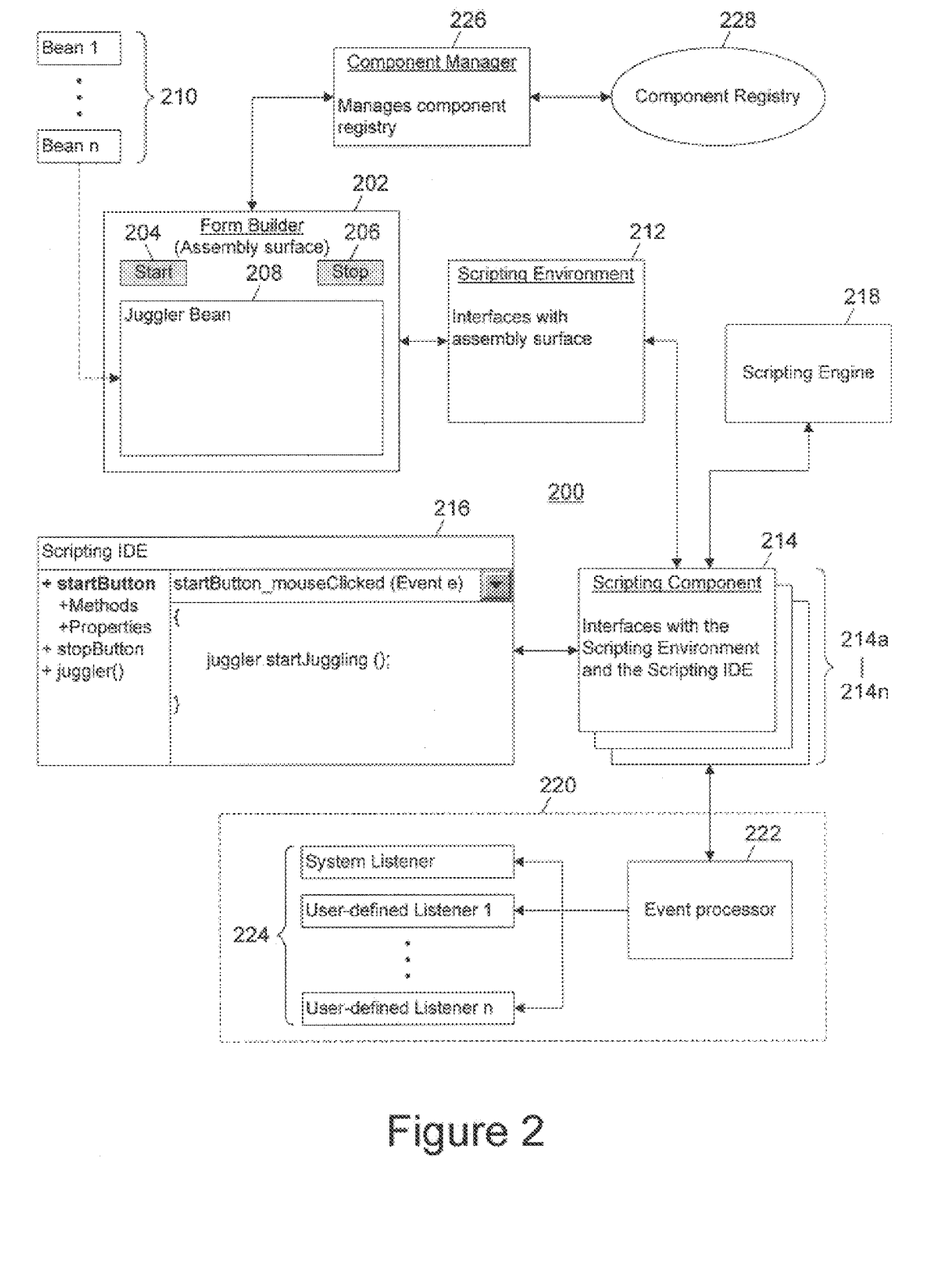
FIG. 2 is a diagram of an application employing a scripting architecture in accordance with a preferred embodiment of the present invention.

Referring to FIG. 2, there is illustrated an application employing a scripting architecture in accordance with a preferred embodiment of the present invention. Scripting capability may be provided to any application through the public interfaces defined in the scripting architecture of the present invention. Scripting architecture or framework 200 includes an assembly surface 202, a scripting-enabled application for writing scripts connecting Java components or beans together which is called "Form Builder" in the exemplary embodiment. Application 202 in the depicted example includes a number of controls 202 and 204, and should provide the ability to select one or more beans 208 from a number of existing beans 210 for the purpose of creating scripts connecting to the selected beans. Application 202 instantiates and manages a scripting environment 212, which is the application programming interface utilized by Java programmers to allow specified objects to be scripted. Scripting environment 212 may connect to a scripting component 214, which implements all scripting language related methods for editing and runtime. Scripting component 214 connects scripting environment 212 to a scripting integrated development environment (IDE) 216, a scripting engine 218, and an event processing module 220.

Scripting component 214 is scripting language dependent, handling all scripting language related work. Scripting IDE 216 allows a user to type in script code to be wired to various beans selected by application 202, which may include a control (such as a menu item like "Edit Script") for bringing up the user interface to scripting IDE 216. Scripting engine 218 is the specific scripting language in which the script is written and run, such as Java, Lotus, Glue, or Visual Basic (VB). Event processing module 220 provides a connection between the events fired by objects/beans in scriptable application 202 and the script itself, and includes scripting event processor 222, which is created and managed by scripting component 214, and a set of event listeners 224. Event processing module 220 is independent of the target scripting language.

Scripting architecture 200 also includes scripting component manager 226 and scripting component registry 218. Scripting component manager 226 manages scripting component registry 228, which keeps track of all the scripting components 214a–214n installed in scripting architecture 200. A single scripting component cannot be implemented which works for all available scripting languages. Therefore, scripting architecture 200 includes at least n scripting components 214a–214n, each implemented for a particular target scripting language and responsible for exchange of data and control between application 202 and scripting IDE 216 when selected. Scripting component registry 228 is maintained in a separate data file and contains registration information for all scripting components 214a–214n. Scripting component manager 226 provides interfaces for registering, deregistering, and creating scripting components, and allows application 202 to select a particular scripting component 214 from scripting components 214a–214n which for connecting a script to selected bean 208. The selected scripting component may then be utilized to create and save scripts, with the necessary runtime-only information, including the runtime event processor and a runtime name manager, saved separately from the information used to edit the script.

Through the elements depicted in FIG. 2 and described in further detail below, scripting architecture 200 allows Java developers to script objects such as Java beans so that they may be wired together within an integrated environment such as application 202. Scripting architecture 200 provides a set of classes defining public interfaces needed to script a selected Java bean 208, aggregate scripted beans in a scripting-enabled application such as application 202, or connect to a custom scripting IDE—rather than generic scripting IDE 216—for script development.

Figure 3A:
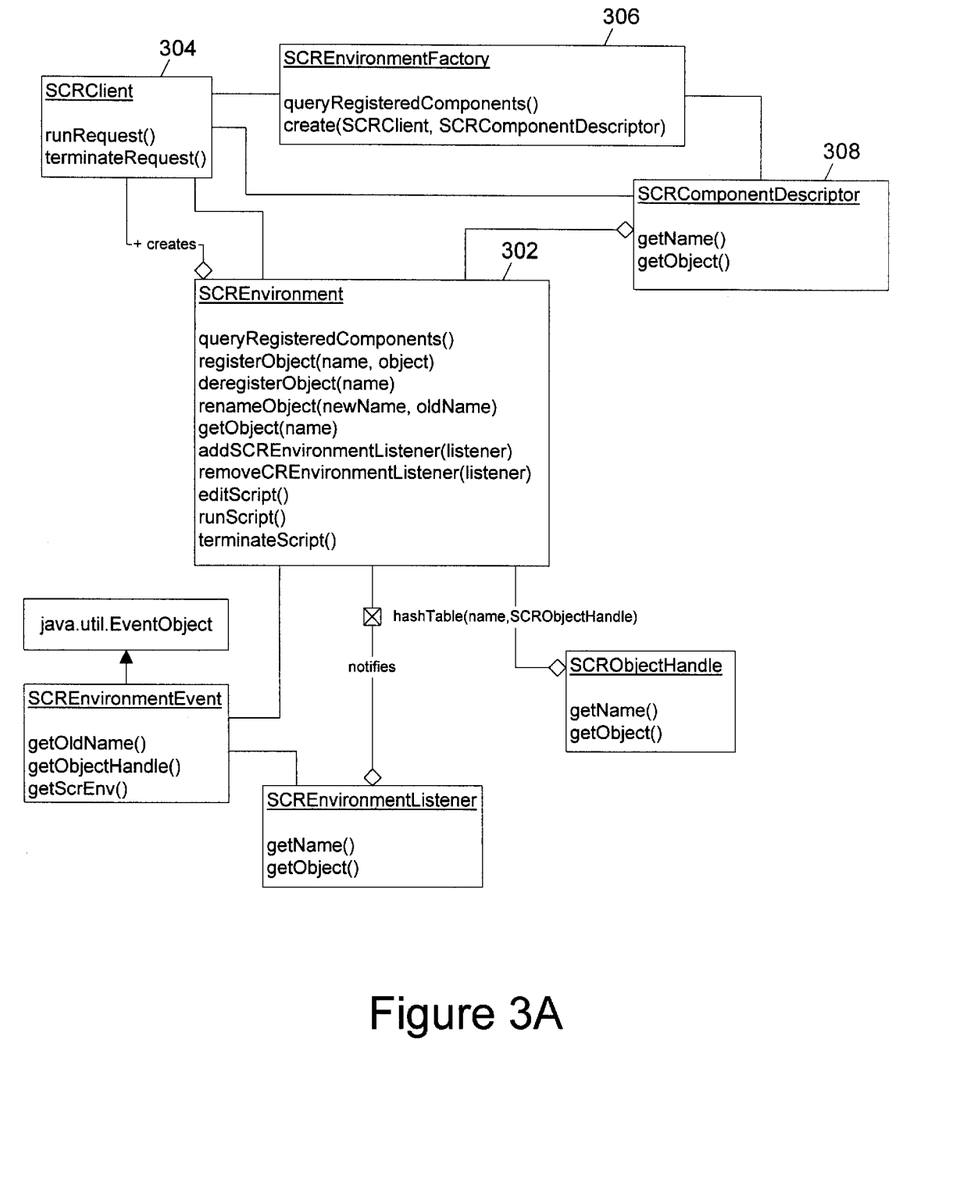
FIGS. 3A–3D depict diagrams of a scripting environment within a scripting architecture in accordance with a preferred embodiment of the present invention.

With reference now to FIGS. 3A–3D, diagrams for a scripting environment within a scripting architecture in accordance with a preferred embodiment of the present invention are depicted. FIG. 3A is a user-level class and interface diagram for scripting environment 212 within scripting architecture 200. The scripting environment includes an object of a scripting environment ("SCREnvironment") class 302, which is instantiated by a Java application programmer wishing to persistently associate a Java object with a script in one of the supported scripting languages. The client of SCREnvironment class 302 does not need to have scripting language dependent knowledge, since SCRRnvironment class 302 provides the connection to different scripting architectures. The scripting environment class 302 is an API that a Java programmer utilizes to allow specified objects or beans to be scripted. A scripting client ("SCRClient") class 304 is implemented by an object or application which requires a scripting environment, and provides the objects in which the scripting environment may process scripts against. Scripting client 304 registers objects to be scripted with scripting environment 302, and initiates serialization and deserialization of scripting environment 302. Scripting client 304 is called back when a request to run or terminate a script is made. Scripting client 304 initiates editing, running, and termination of the scripts, which is generally initiated by a scripting IDE, by calling methods and interfaces in scripting environment 302.

A scripting environment creation ("SCREnvironmentFactory") class 306 is used to instantiate the scripting environment object 302. A scripting component description ("SCRComponentDescriptor") class 308, which describes the particular scripting language which may be utilized, is retrieved from scripting environment object 302. Scripting environment object 302 is constructed with scripting component description class 308, which connects the scripting environment object 302 to a particular scripting engine such as Visual Basic. Within scripting environment object 302, a unique name associated with an object registered for scripting by, scripting object handle ("SCRObjectHandle") class 310, is utilized for scripting the object. A scripting environment listener ("SCREnvironmentListener") class 312 is notified whenever an object is registered or deregistered, or renamed events are fired from scripting environment object 302. Events fired by scripting environment object 302 are contained by a scripting environment event object ("SCREnvironmentEvent") 314 associated with the event.

Figure 3B:
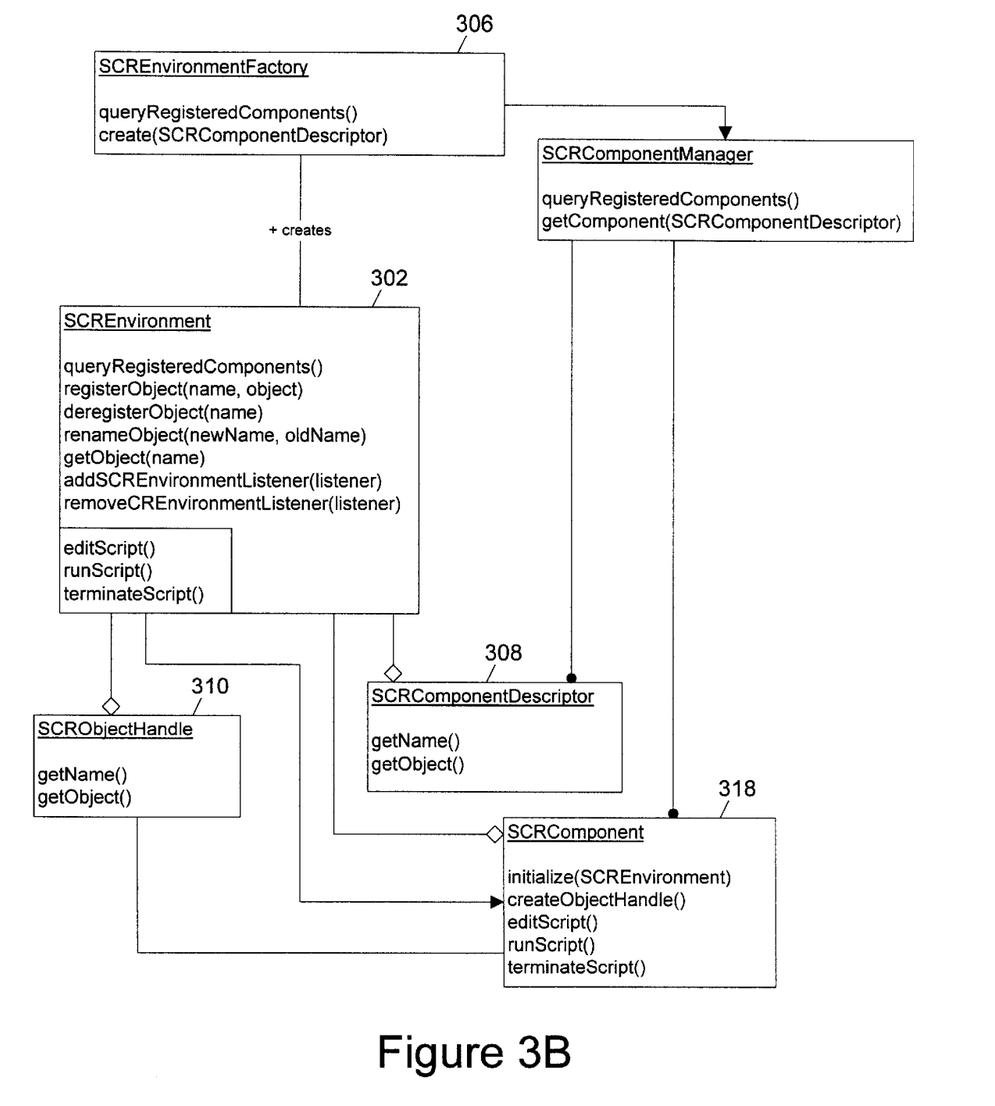

FIG. 3B is an internal class and interface diagram for scripting environment 212 within scripting architecture 200. Scripting environment creation class 306 is instantiated to create scripting environment object 302. Scripting environment creation class 306 also creates a scripting component manager ("SCRComponentManager") object 316 if one does not already exist in order to retrieve a list of available scripting languages and create scripting component description class 308, which describes the desired scripting language. Scripting component manager 316 maintains a list of registered scripting components and returns a list of scripting component description class 308 members to scripting environment object 302. Scripting component manager 316 utilizes its list of scripting components such as scripting component 318 to create a specific scripting component 318 in response to receiving a particular scripting component description class 308 member from scripting environment object 302. Scripting component manager 316 creates the particular scripting component 318 which matches a given member of scripting component description class 308 selected by scripting environment object 302 and indicating a desired scripting language. The selected scripting component 318 may be one of multiple scripting components. Scripting component 318 provides scripting environment object 302 with an interface for a particular scripting language and represents the scripting engine. A scripting component must be implemented for each scripting language supported for scripting via scripting environment object 302. Scripting environment object 302 provides the API to register, deregister, and retrieve objects or beans for scripting purposes.

Scripting environment object 302 also maintains a dictionary of objects registered for scripting. Registered objects are identified within the scripting environment object 302 dictionary by scripting object handle 310, which is created by scripting component 318. Scripting object handle 310 may be implemented, for example, by creating a derived class of an object to be registered for scripting purposes and adding per object information specific to scripting component 318. Scripting environment object 302 fires a scripting environment event to the scripting environment listener(s) whenever objects are registered, deregistered, or renamed within scripting environment object 302. Scripting environment 302 also provides a mechanism to initiate the IDE (if any) of a particular scripting component and a mechanism to execute the script associated with a registered object, initiating and terminating script execution.

Figure 3C:
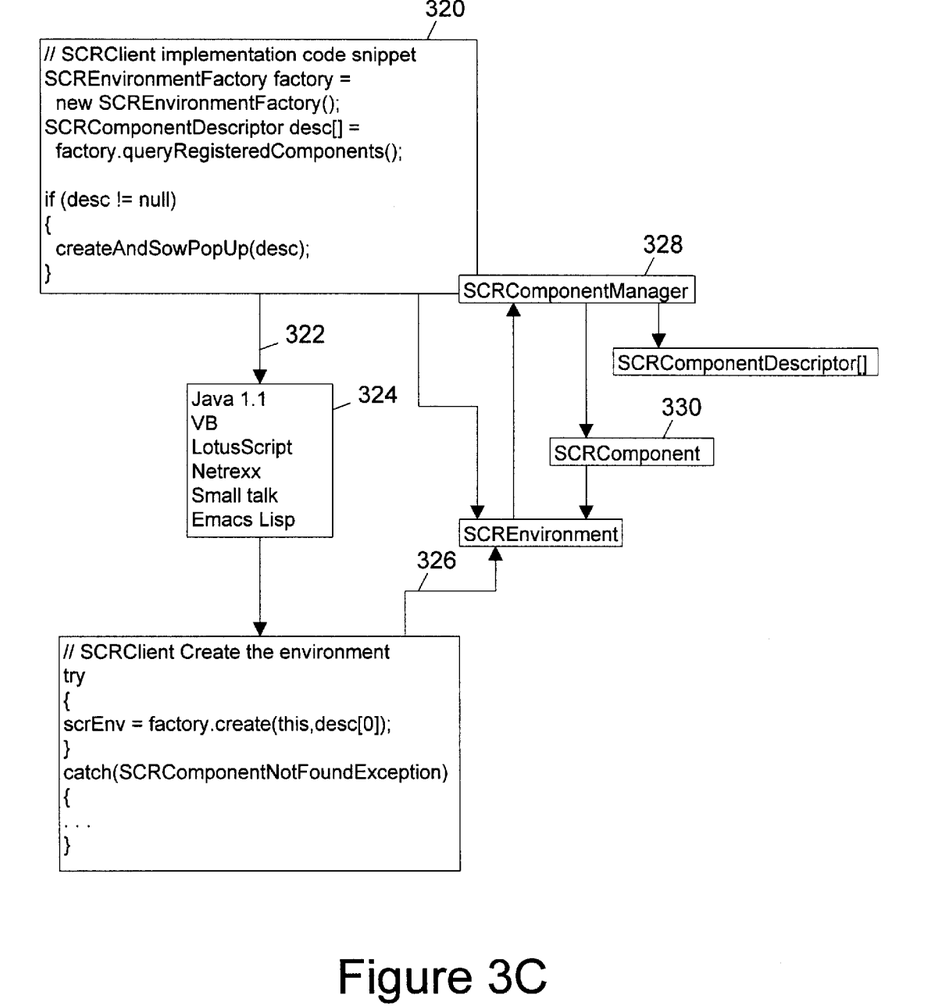

FIG. 3C is a timing diagram for creation of scripting environment 212 within scripting architecture 200. First, as depicted in step 320, a scripting client executes the query function queryRegisteredComponents(), which creates a scripting component manager if one does not already exist. The query is then delegated the scripting component manager. Next, as illustrated in step 322, the scripting component manager returns a list of members of the scripting component description class. As a result, as depicted in step 324, the client receives the information from the scripting component description class and builds a dialog for the end user to select a scripting component.

When the end user makes a selection regarding the scripting language desired, a scripting environment object is created using the corresponding member of the scripting component description class, as illustrated in step 326. During creation, the scripting environment object requests the scripting component manager to create a scripting component matching the specified member of the scripting component description class, as depicted in step 328. The scripting component manager creates the scripting component, as illustrated in step 330. If no components match the descriptor and an exception is thrown, the scripting environment is not valid.

Figure 3D:
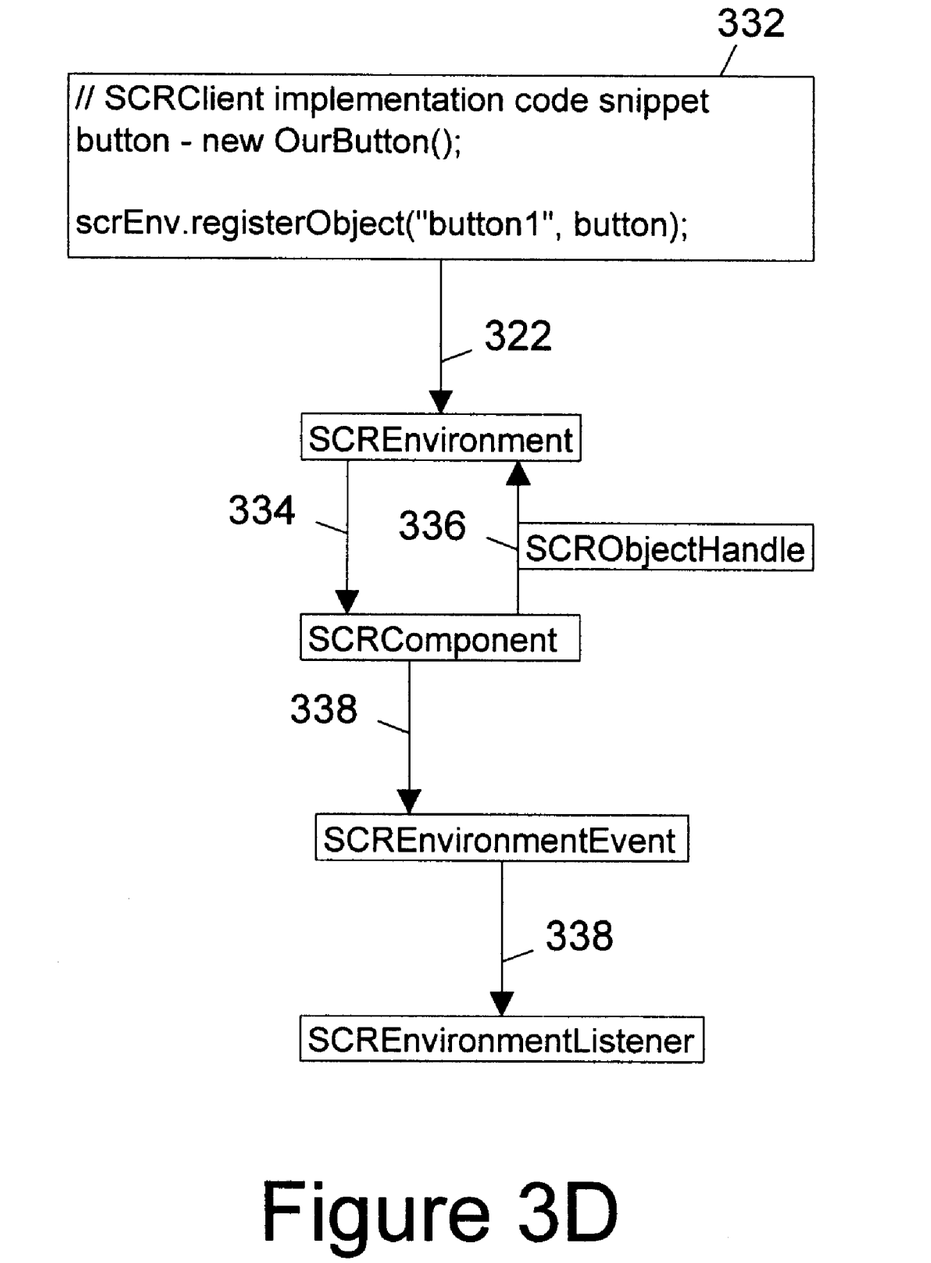

FIG. 3D is a timing diagram for registering objects with scripting environment 212 within scripting architecture 200. The process begins, as illustrated in step 332, with a scripting client which wishes to script an object ("button"). The scripting client registers the object with the scripting environment. The scripting environment requests that the scripting component create an object handle for the object, as depicted in step 334. The scripting component creates and returns an object handle for the object, as illustrated in step 336. Finally, as depicted in step 338, the scripting environment then registers the object utilizing the object handle and fires an object registered event to all scripting environment listeners.

Figure 4A:
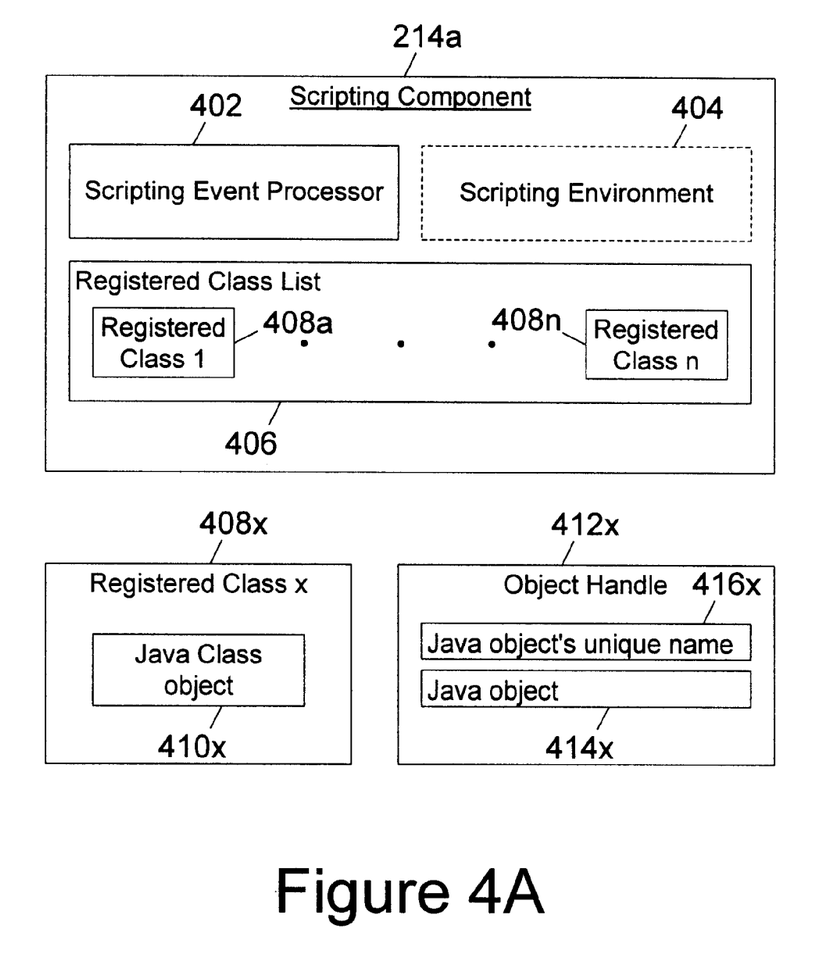
FIGS. 4A–4E are diagrams of scripting components within a scripting architecture in accordance with a preferred embodiment of the present invention.

Referring to FIGS. 4A–4E, diagrams of scripting components within a scripting architecture in accordance with a preferred embodiment of the present invention are illustrated. The scripting components may be among the several scripting components 214a–214n within scripting architecture 202. FIG. 4A depicts a user level class and interface diagram for a generic scripting component class 214a, which defines an interface for all scripting components 214a–214n and implements the features which are common for all scripting components 214a–214n. Scripting component class 214a should handle object and class registration and should perform data marshaling, introspection, method invoking, event delivering, and related work. Additional scripting components for particular scripting languages should be subclassed from generic scripting component 214a.

Scripting component 214a includes an interface 402 to the scripting event processor module and a pointer 404 to the scripting environment. Scripting component 214a also maintains a registered class list 406, which contains an identification of each class or data type registered with scripting component 214a for scripting. When scripting component 214a encounters a new class or data type, it creates a new registered class 408a–408n and registers the class identification within registered class list 406. Each registered class 408x is an object created during class registration which holds a corresponding Java class object 410x and associated class information. Scripting component developers may subclass from a registered class 408x to store component specific information. An object handle 412x is created when the scripting environment registers a new object with scripting component 214a. Object handle 412x is a place to associate the Java object 414x with its unique name 416x and other related information. Again, scripting component developers may subclass from an object handle 412x to store component specific information. After registration of Java object 414x, object handle 412x is owned by the scripting environment. Scripting component 214a notifies the scripting IDE during design or debugging time, the event processing module, and scripting engine during runtime or design time for script generation. During runtime, scripting component 214a may need to provide a method for a scripting engine to query any registered object.

Figure 4B:
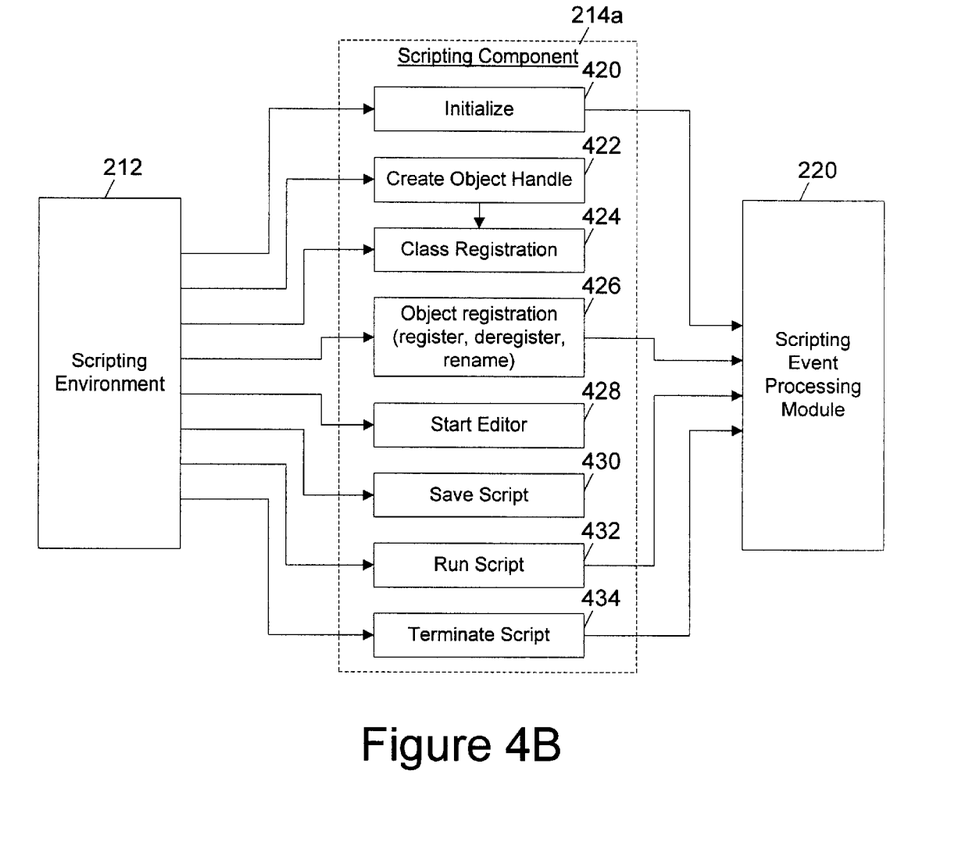

FIG. 4B depicts an implementation module diagram for a generic scripting component class 214a. Scripting component 214a includes an initialization method 420 for initializing scripting component 214a, which may be called by scripting environment 212. Initialization method 420 registers scripting component 214a as a scripting environment 212 listener and gets all existing object handles and registers them. Initialization method 420 initializes event processing module 220 if it has not been streamed in already. Scripting component 214a also includes a method 422 for creating object handles which may be called by scripting environment 212. Object naming method 422 creates an object handle for the object and inserts the object's unique name and the Java object and registers the object's class. Class registration method 424 may be called by scripting environment 212 or by register object method 426. If the class is already registered, class registration method 424 returns the registered class object; otherwise a new registered class objected is created and returned. Object registration method 426 may be called by scripting environment 212 or by initialization method 420. Object registration method 426 registers, deregisters, or renames an object with event processing module 220 and may be subclassed for registering, deregistering, or renaming the object with the scripting IDE and scripting engine.

Scripting component 214a also includes an edit script method 428, a save script method 430, a run script method 432, and a terminate script method 434. Edit script method 428 may be called by scripting environment 212 and, preferably implemented through a subclass, starts the scripting IDE. Save script method 430 may be called by the scripting environment 212 and, preferably implemented through a subclass, saves an edited script. Run script method 432 may be called by scripting environment 212 and, preferably implemented through a subclass, starts the scripting engine and turns the runtime event processor within event processing module 220 to run mode in order to run the current script. Terminate script method 434 may be called by scripting environment 212 and, preferably implemented through a subclass, turns the runtime event processor within event processing module 220 to edit mode to terminate a running script.

Figure 4C:
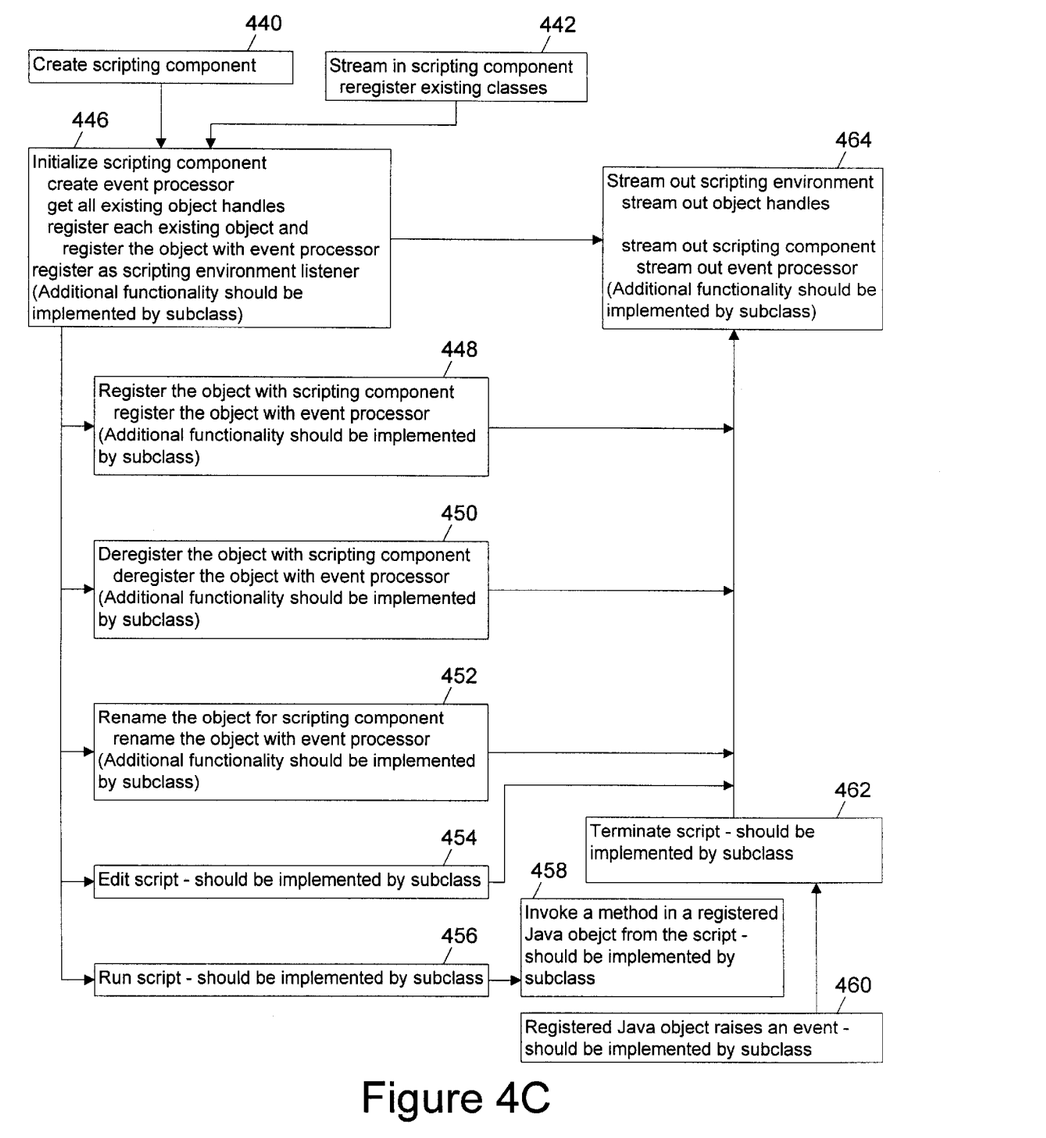

FIG. 4C depicts a timing diagram for generic scripting component 214a. Scripting components are either created by the scripting component manager, as illustrated in step 440, or streamed in by the scripting environment, as depicted in step 442. In either case, the process proceeds initialization of the scripting component, as illustrated in step 446. During initialization, the event processor is created, if it doesn't already exist. Additionally, all existing object handles are retrieved and the existing objects are registered with the scripting component and with the event processor. The scripting component is also registered as a scripting environment event listener during initialization. Additional functionality may be implemented as a subclass of the initialization method.

As described, the initialization method necessarily invokes the object registration method which, as illustrated in step 448, registers objects with the scripting component and the event processor. The object registration method is invoked to register all existing objects at the time of initialization and may be subsequently invoked to register additional objects. The object registration method may also be invoked to deregister an object with the scripting component and event processor, as depicted in step 450, or to rename an object with the scripting component and event processor, as illustrated in step 452. Additional functionality for the object registration methods should be implemented by a subclass. After initialization, the edit script method may also be invoked, as depicted in step 454. The functionality for implementing script editing should preferably be implemented through a subclass.

After initialization the run script method may be invoked, as illustrated in step 456, preferably implemented through a subclass. The run script method call a method within a registered Java object from the script, as depicted in step 458. In response, the registered Java object may raise an event, as illustrated in step 460, and the terminate script method may be invoked, as depicted in step 462. From any of steps 448, 450, 452, 454, or 462, a stream out method 464 may be invoked. Scripting environment and object handles for all existing objects are streamed out of the scripting component, which is itself streamed out together with the event processor from the event processing module.

Figure 4D:
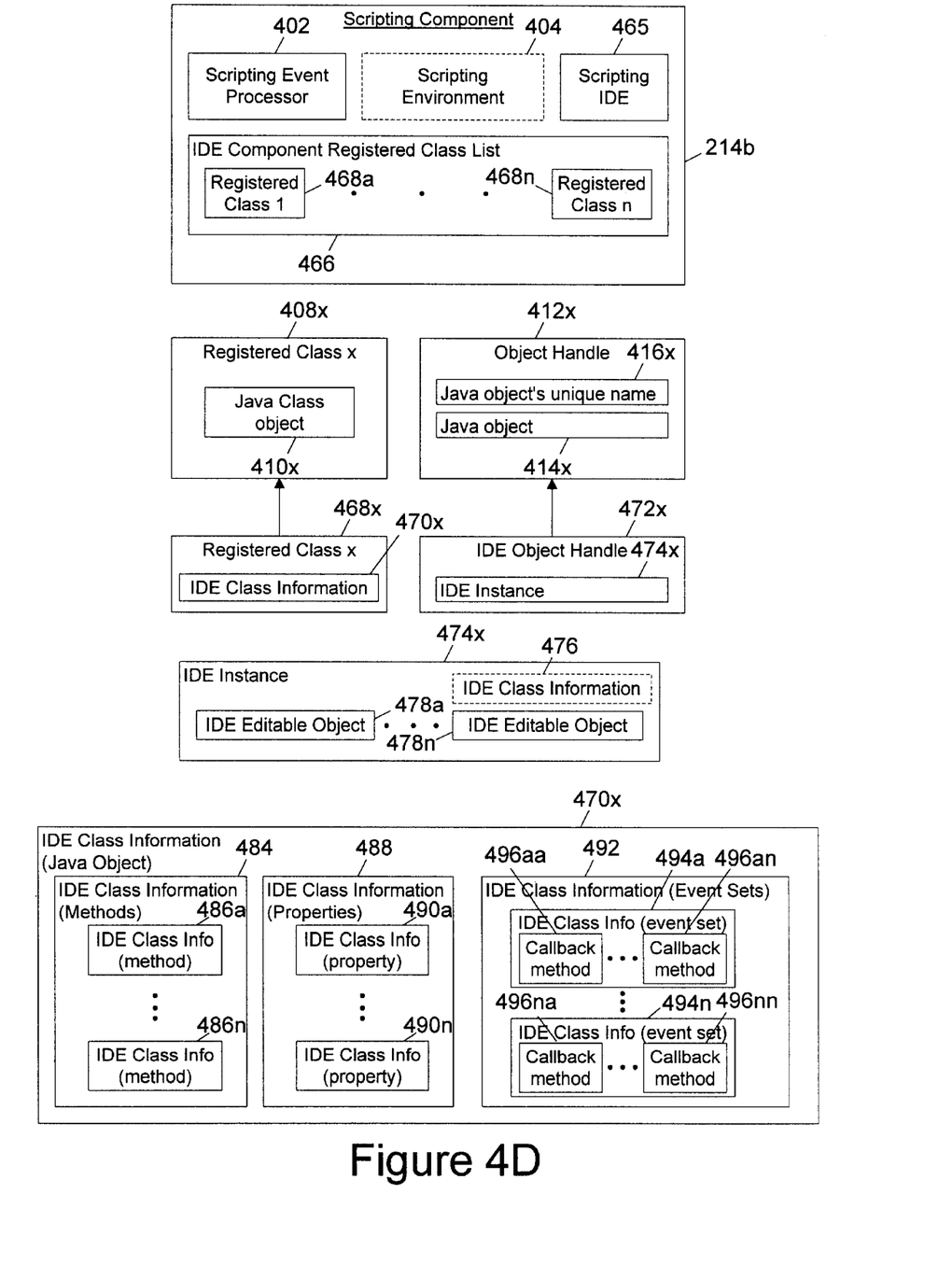

FIG. 4D depicts a user level class and interface diagram for an IDE scripting component 214b for scripting IDE 216 within scripting architecture 202. IDE scripting component 214b is a subclass of generic scripting component 214a, and connects to scripting IDE 216 through a set of special interfaces. IDE scripting component 214b notifies scripting IDE 216 when an object is registered, deregistered, or renamed, provides scripting IDE 216 with the class information and related script information for each registered object, and retrieves the requirements from scripting IDE 216 for saving and/or running a current script. Each scripting component for a particular scripting language which utilizes scripting IDE 216 should be a subclass of IDE scripting component 214b.

In addition to the interfaces and classes for generic scripting component 214a, IDE scripting component 214b includes an IDE component registered class list 466, which includes identification of each IDE component registered class 468a–468n. Each IDE component registered class 468x is a subclass of a registered class 408x for the Java class object 410x. IDE component registered class 468x contains the IDE class information 470x. For registered objects, scripting component 214b creates an IDE object handle 472x for the corresponding Java object 414x, in addition to and as a subclass of scripting object handle 412x. In addition to the registered Java object's unique name 416x and the registered Java object 414x, IDE object handle 472x stores the IDE instance associated with the registered Java object 414x.

Each IDE instance 474x stores additional information associated with the registered Java object instance 414x, including a pointer 476 to IDE class information 470x and a list of IDE editable objects 478a–478n. Each IDE editable object 478a–478n stores a piece of script related with one event callback and the prototype of the event callback method. IDE class information 470x contains the introspected class information for a registered Java class. IDE class information 470x is maintained in a tree structure, including a methods list 484 containing identification of introspected methods 486a–486n, a properties list 488 containing identification of introspected properties 490a–490n, and an events list 492 containing identification of introspected properties 494a–494n. Each identification of introspected events 494a–494n contains a respective identification of callback methods 494aa–494an and 494na–494nn for the corresponding events. IDE class information 470x provides a mechanism to maintain the introspected information, through a subclass which performs the introspection and builds the tree.

Figure 4E:
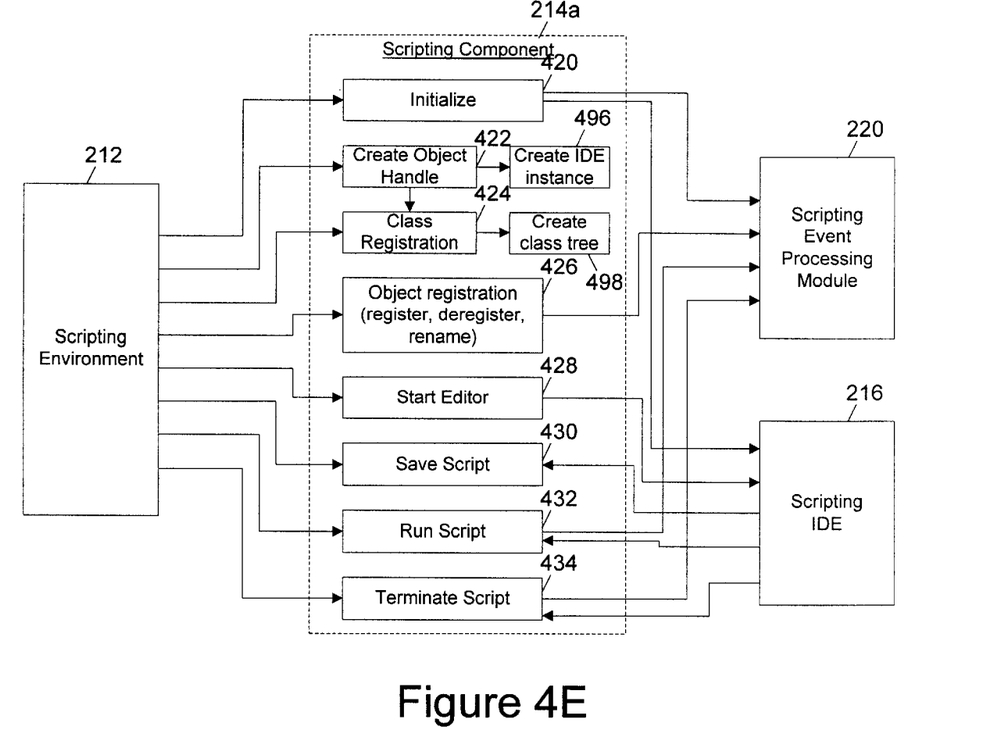

FIG. 4E depicts an implementation module diagram for IDE scripting component class 214b. The methods depicted within IDE scripting component 214b call the corresponding methods in the parent class, generic scripting component 214a. In addition, the create object handle method 422 invokes a create IDE instance method 496 which creates the IDE instance of the registered object and adds in IDE editable objects. The class registration method 424 invokes create class information tree method 498, which creates IDE registered class objects, performs the required introspection and fills in the class information tree.

Figure 5A:
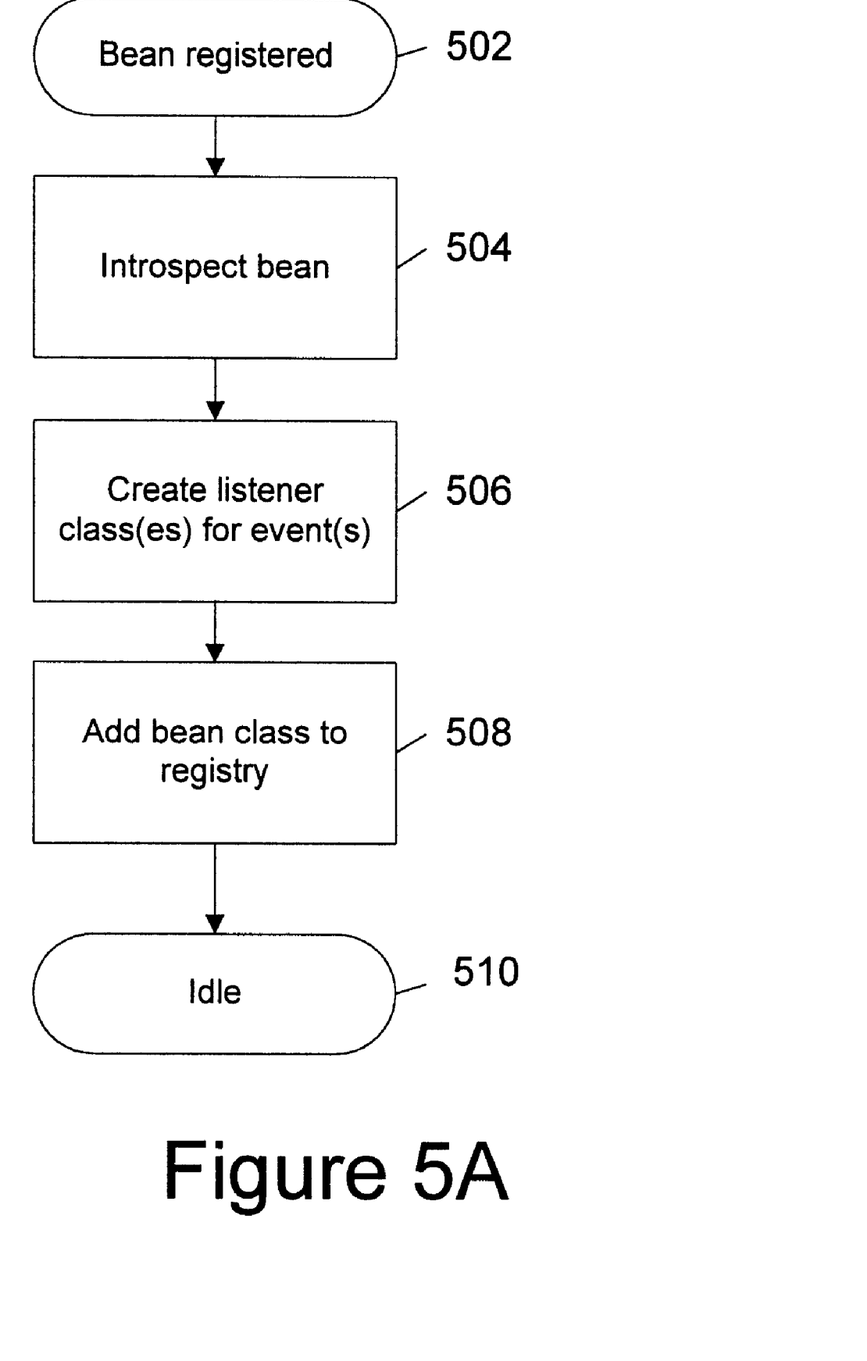
FIGS. 5A–5B are high level flowcharts for the operation of an event processing module within a scripting architecture in accordance with a preferred embodiment of the present invention.
Figure 5B:
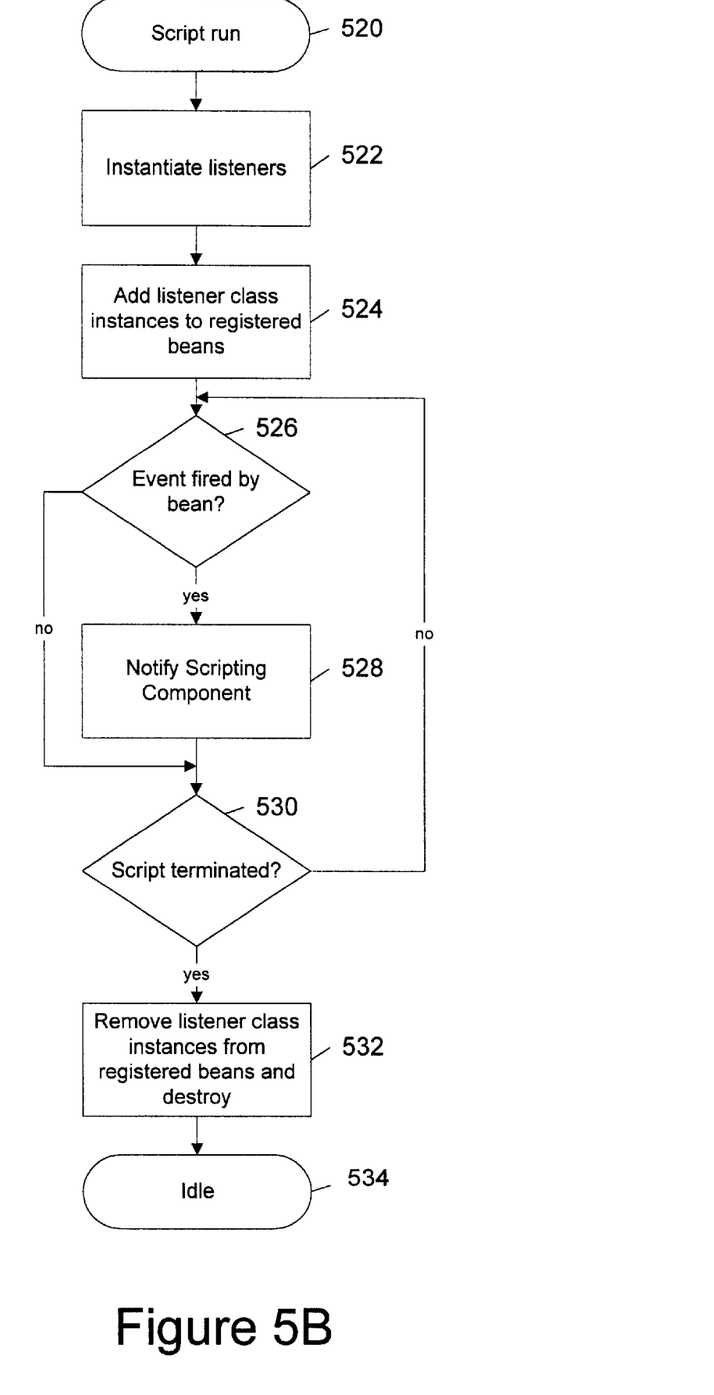

Referring to FIGS. 5A–5B, high level flowcharts for the operation of an event processing module within a scripting architecture in accordance with a preferred embodiment of the present invention are illustrated. The process illustrated may be implemented, for example, within an event processing module 220 depicted in FIG. 2. FIG. 5A depicts a process within the event processing module during creation of a script. The process begins at step 502, which depicts a bean being registered with a scripting component. The process passes to step 504, which illustrates the event processing module introspecting the registered bean to determine all events which it can fire. The process next passes to step 506, which depicts the event processing module creating a system listener class, subclasses of a SCRBaseEventListener class, for each of those events. The process next passes to step 508, which illustrates adding the registered bean class to a registry of all registered bean classes, and then to step 510, which depicts the process becoming idle until a new bean class is registered with the scripting component.

FIG. 5B depicts a process within the event processing module when a script is run. The process begins at step 520, which depicts initiation of the running of a script. The process next passes to step 522, which illustrates the event processing module instantiating listener classes for all registered beans within the script, and then to step 524, which depicts the event processing module adding the listener class instances to the registered beans. These steps allow the event processing module to listen to events fired by the registered beans. The process then passes to step 526, which illustrates a determination by the event processing module of whether an event has been fired by a bean. If so, the process proceeds to step 528, which depicts notifying the scripting component of the event. The scripting component may then take action to invoke the appropriate methods on a script object.

From step 528, or if no event has been fired by a registered bean, the process proceeds to step 530, which depicts a determination by the event processing module of whether the script has been terminated. If not, the process returns to step 526 to determine if another event has been fired by a registered bean. If the script has been terminated, however, the process passes to step 532, which illustrates the event processing module removing the listener class instances from the registered beans and destroying those instances. The process then passes to step 534, which depicts the process becoming idle until a script is again run.

The present invention provides a generic Java-based event processor module which listens to all events fired by registered Java bean. Beans are introspected to determine what kind of Java-defined and user-defined events the bean may fire. Java code for a listener class is then generated for user-defined events, compiled, and loaded. For each registered bean class, the event processor thus creates all possible event listeners. In a scripting architecture where the beans are tied to each other with a script, this event listener thus listens to all possible events that are fired by all the beans and informs the client—the scripting component—when an event is fired. This event processor works well with any bean for any kind of event. The event processor of the present invention obviates the need to wrap an event sink to make it an event listener as well as the need to wrap an event source to make it generate events in a specific manner. The present invention also allows events to be passed between the source and sink without them knowing about each other.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CD-ROMs and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of handling events within scripted components, comprising:

introspecting each component registered with a scripting environment component to determine all events which each respective component may fire; and for each registered component, creating a separate listener class for each different event which the respective component may fire, wherein each listener class is connected to an event processor for a scripting component and notifies the scripting component when a corresponding event is fired to enable two or more registered components to be connected by a script.

2. The method of claim 1, wherein the step of introspecting each component registered with a scripting environment component to determine all events which each respective component may fire further comprises:

determining all Java-defined events and all user-defined events which each respective component may fire.

3. The method of claim 1, further comprising:

for each registered component, instantiating the listener class for each event which the component may fire.

4. The method of claim 1, wherein the step of introspecting each component registered with a scripting environment component to determine all events which each respective component may fire further comprises:

introspecting a plurality of components registered with the scripting environment component to determine all events which the components may fire.

5. The method of claim 1, further comprising:

upon detection by an instantiated listener class of an event being fired by a first registered component, notifying a second registered component registered with the a scripting component for callback when the event fires.

6. The mechanism of claim 1, further comprising:

means for instantiating the listener class for each event which the component may fire.

7. The method of claim 3, further comprising:

upon detection by an instantiated listener class of an event being fired by a registered component, notifying the scripting component connected to the event processor.

8. The method of claim 3, further comprising:

destroying the instances of the listener classes.

9. The mechanism of claim 6, further comprising:

means for notifying the scripting component connected to the event processor upon detection by an instantiated listener class of an event being fired.

10. The method of claim 6, further comprising:

means for destroying the instances of the listener classes.

11. A mechanism for handling events within scripted components, comprising:

a component registered with a scripting environment component;

means for introspecting the component to determine all events which the component may fire; and a listener class for each event which the component may fire, each listener class connected to an event processor for a scripting component and notifying the scripting component when a corresponding event is fired to enable the component to be connected by a script to another component registered with the scripting environment component.

12. The mechanism of claim 11, wherein the means for introspecting the component to determine all events which the component may fire further comprises:

means for determining all Java-defined events and all user-defined events which the component may fire.

13. The mechanism of claim 11, further comprising:

means for introspecting a plurality of components registered with the scripting environment component to determine all events which the components may fire; and a listener class for each event which a component within the plurality of components may fire, wherein each listener class is connected to the event processor.

14. The mechanism of claim 11, further comprising:

means for notifying a component registered with a scripting component for callback when an event fires upon detection by an instantiated listener class of the event being fired.

15. A computer program product within a computer usable medium, comprising:

instructions in the computer usable medium for introspecting a component registered with a scripting environment component to determine all events which the registered component may fire; and instructions in the computer usable medium for creating a separate listener class for each different event which the registered component may fire, wherein the listener class is connected to an event processor for a scripting component and notifies the scripting component when a corresponding event is fired by the registered component to enable the registered component to be connected through a script to another registered component.

16. The computer program product of claim 15, wherein the instructions for introspecting a component registered with a scripting environment component to determine all events which the component may fire further comprise:

instructions for determining all Java-defined events and all user-defined events which the component may fire.

17. The computer program product of claim 15, further comprising:

instructions in the computer usable medium for instantiating the listener class for each event which the component may fire upon initiation of execution of a script; and instructions in the computer usable medium for adding the instantiated listener classes to the component.

18. The computer program product of claim 15, further comprising:

instructions in the computer usable medium for introspecting a plurality of components registered with the scripting environment component to determine all events which the components may fire; and instructions in the computer usable medium for creating a listener class for each event which a component within the plurality of components may fire, wherein each listener class is connected to the event processor.

19. The computer program product of claim 17, further comprising:

instructions in the computer usable medium for notifying a scripting component connected to the event processor upon detection by an instantiated listener class of an event being fired.

20. The computer program product of claim 17, further comprising:

instructions in the computer usable medium for removing the instantiated listener classes from the component upon termination of execution of the script; and instructions in the computer usable medium for destroying the instances of the listener classes.

* * * * *